W. B. WOOD.
Steam-Cooker.

No. 225,905.  Patented Mar. 23, 1880.

Witnesses:
P. C. Dietrich
Jno. H. Stockman

Inventor
William B. Wood
Per C. H. Watson & Co. Attorneys.

UNITED STATES PATENT OFFICE.

WILLIAM B. WOOD, OF FRANKLIN, KENTUCKY.

STEAM-COOKER.

SPECIFICATION forming part of Letters Patent No. 225,905, dated March 23, 1880.

Application filed February 4, 1880.

*To all whom it may concern:*

Be it known that I, WILLIAM B. WOOD, of Franklin, in the county of Simpson and State of Kentucky, have invented certain new and useful Improvements in Steam-Cookers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in steam-cookers; and it consists in the construction and arrangement of parts, as will be hereinafter more fully set forth, and pointed out by the claim.

Figure 1:
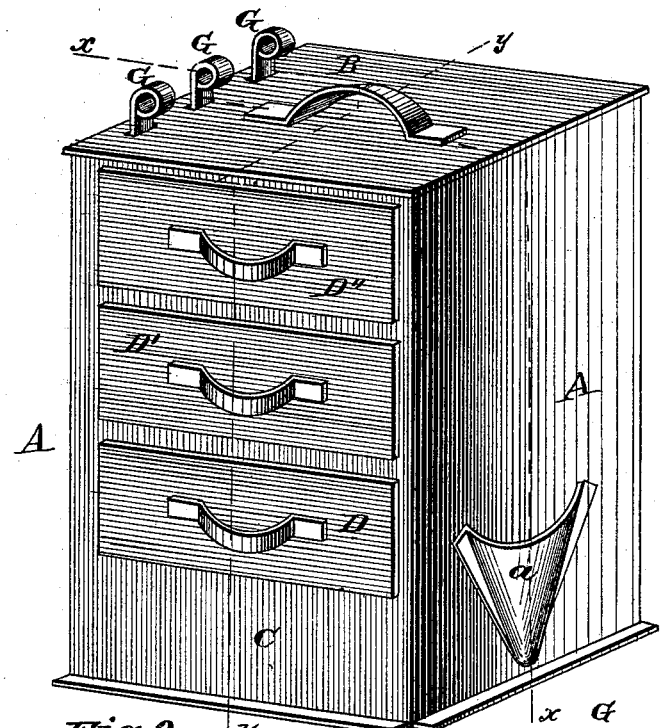
Figure 2:
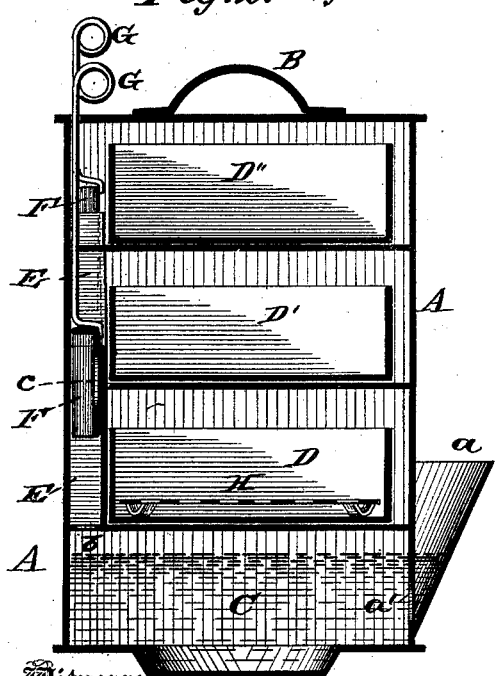
Figure 3:
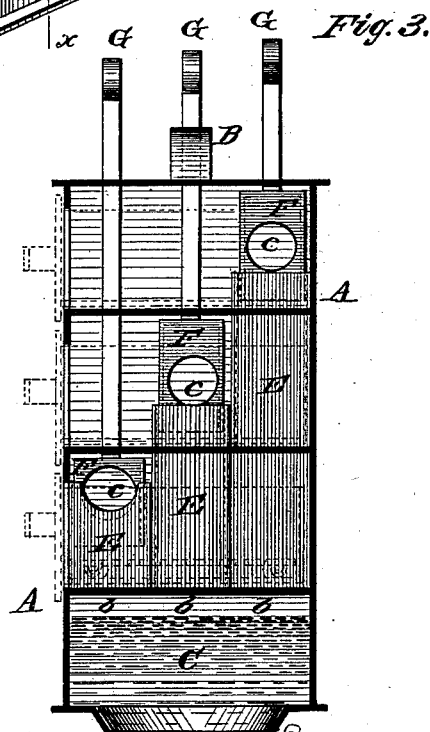

In the annexed drawings, Figure 1 is a perspective view. Fig. 2 is a section on line $x\,x$ of Fig. 1; and Fig. 3 is a section on line $y\,y$, Fig. 1.

In the drawings, A indicates the outer case; B, the handle; C, water-reservoir; D D' D", cooking chambers or drawers; E, flues leading from reservoir to cooking-chamber; F, cut-offs or valves in flues; G, handles for operating cut-offs; H, perforated plate; $a$, funnel at side of case communicating with reservoir by opening $a'$; $b$, openings in flues; $c$, openings in cut-offs or valves.

The case A is made preferably of tin, and in the form shown, its bottom being adapted to fit upon an opening in a stove.

The cooking-chambers D D' D" slide in and out of the casing on the principle of drawers. There is a separate flue communicating with each of these chambers, which has an opening to admit the steam into said chambers. In these flues are arranged cut-offs or valves provided with an opening to register with the opening in the flues, and by which means the steam may be let into any one of the chambers, of which there may be any number, by operating said cut-offs by means of the handles G.

The perforated plate H may be inserted, if desired, its use depending upon the nature of the cooking to be done.

If it is desired to bake bread or other substance, the steam is cut off from the chamber D' and allowed to enter the chambers D D".

Great inconvenience was often found in examining articles in a steam-cooker to see if they were properly prepared, for the reason that the steam was liable to burn the person making the examination.

It will be obvious that by this arrangement the steam can be shut off from any desired compartment and the examination effected without the danger before mentioned.

Having thus fully described my invention, what I claim as new, and desire to secure by Letters Patent, is—

The combination of the casing A, funnel $a$, with opening $a'$, reservoir C, flues E, having openings $b$, cut-offs F, having openings $c$, handles G, and chambers D D' D", constructed substantially as and for the purpose set forth.

In testimony that I claim the foregoing as my own I have hereto affixed my signature in presence of two witnesses.

WILLIAM BASIL WOOD.

Witnesses:
T. O. TOWNSEND,
G. W. WHITESIDES.